(12) United States Patent
Bourgoin

(10) Patent No.: US 8,379,042 B2
(45) Date of Patent: *Feb. 19, 2013

(54) TARGET DISPLAY FOR GAMMA CALIBRATION

(75) Inventor: Michael Bourgoin, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,275

(22) Filed: Jan. 26, 2012

(65) Prior Publication Data

US 2012/0120093 A1 May 17, 2012

Related U.S. Application Data

(63) Continuation of application No. 12/257,559, filed on Oct. 24, 2008, now Pat. No. 8,130,240.

(51) Int. Cl.
*G09G 5/02* (2006.01)

(52) U.S. Cl. .................... 345/589; 345/590; 345/592

(58) Field of Classification Search .................... None
See application file for complete search history.

(56) References Cited

U.S. PATENT DOCUMENTS

| | | | | |
|---|---|---|---|---|
| 6,686,953 | B1 * | 2/2004 | Holmes | 348/179 |
| 7,728,845 | B2 * | 6/2010 | Holub | 345/589 |
| 2007/0285442 | A1 * | 12/2007 | Higgins | 345/690 |
| 2009/0033689 | A1 * | 2/2009 | Avkarogullari et al. | 345/698 |
| 2010/0277517 | A1 * | 11/2010 | Sayre | 345/690 |

* cited by examiner

*Primary Examiner* — Aaron M Richer
*Assistant Examiner* — Leon T Cain, II
(74) *Attorney, Agent, or Firm* — Shook, Hardy & Bacon LLP

(57) ABSTRACT

User interfaces are provided that allow for the display of a target element that may be used to adjust a gamma value of a display device. The target element includes three layers. These layers include a bottom static layer, a gray static layer, and a progressive layer that gradually changes from a fully transparent are to an opaque area. Additionally, a manipulation area is provided, which may be a sliding mechanism. The user may adjust the gamma to a higher value when the fully transparent area appears lighter than the opaque area, and may adjust the gamma to a lower value when the fully transparent area appears darker than the opaque area.

20 Claims, 7 Drawing Sheets

TARGET DISPLAY FOR GAMMA CALIBRATION

CROSS-REFERENCE TO RELATED APPLICATIONS

This application is a continuation of United States patent application Ser. No. 12/257,559 filed Oct. 24, 2008, now U.S. Pat. No. 8,130,240, issued Mar. 6, 2012, which is herein incorporated by reference in its entirety.

BACKGROUND

In order to obtain consistent, accurate, and predictable color rendering on display devices, calibration is typically required to adjust certain aspects of a display so that these aspects conform to a particular standard, such as the sRGB (standard Red Green Blue) standard color space. Display devices often allow for the adjustment of the display's brightness, contrast, gamma, and white point or color balance. There are several ways of calibrating the gamma of display devices, which is the name of the nonlinear operation used to code and decode luminance or tristimulus values in video or still image systems. One such way includes the use of measurement instruments, which may include a colorimeter or spectrophotometer. Another such way is to present the user with a visual target image that guides the gamma adjustment. Traditionally, visual target images that have been used for gamma adjustment require the viewer of the display device to squint or use other methods to blur or put the viewer's eyes out of focus to get an accurate adjustment of the gamma. These visual target images are therefore not user friendly, requiring considerable time and effort on the part of the viewer.

SUMMARY

Embodiments of the present invention relate to user interfaces and methods for adjusting the gamma of a display device such that the gamma value is moved toward a predetermined optimal gamma value. Using the sRGB standard color space, the predetermined optimal gamma value may be 2.2. A gamma adjustment target is provided to aid in allowing for an efficient and effective gamma adjustment. The gamma adjustment target may include an internal target element and multiple surrounding target elements and may be constructed from three distinct, logical layers. A first layer is a bottom static layer having alternating light and dark lines, which, in one instance, may be black and white lines, and may be horizontal in one instance. In one embodiment, the alternating dark and light lines are of equal height, but in another embodiment, the lines are not of equal height such that the dark lines are taller than the light lines, or the other way around. In another embodiment, instead of alternating light and dark lines to achieve half-toning, randomly distributed dots may be used, which would achieve the same half-toning effect as alternating light and dark lines. Half-toning, or any type of partial toning occurs when a certain pattern gives the visual effect of some or all of the space being a certain color, or tone. For example, if white and dark lines of equal height are the pattern used, the overall visual effect may be the illusion of gray.

A second layer is a gray static layer that consists of a solid gray overlay. The gray value of this gray overlay may be chosen to target a specific gamma level. A third layer is a progressive layer that may take the form of a circular gradient having a fully transparent area that gradually progresses outward to an opaque area. The progressive layer is an operator that is used to modulate the transparency of the gray static layer. The resulting gamma adjustment target is a single image constructed by the image processing composition of these three layer elements, including the application of the progressive layer (e.g., transparency gradient layer) to gray static layer (e.g., solid gray layer). This allows the bottom static layer to show through the gray static layer, according to the transparency of the gray static layer. While the gamma adjustment target does not change throughout the gamma adjustment process, the viewer's perception of the target does change such that the region shaded by lines visible through the fully transparent area appears lighter than its surroundings when the gamma is lower than the predetermined optimal gamma value, but darker than its surroundings when the gamma is higher than the predetermined optimal gamma value. When the gamma has been adjusted toward the predetermined optimal gamma value, the fully transparent area appears to blend into its surroundings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
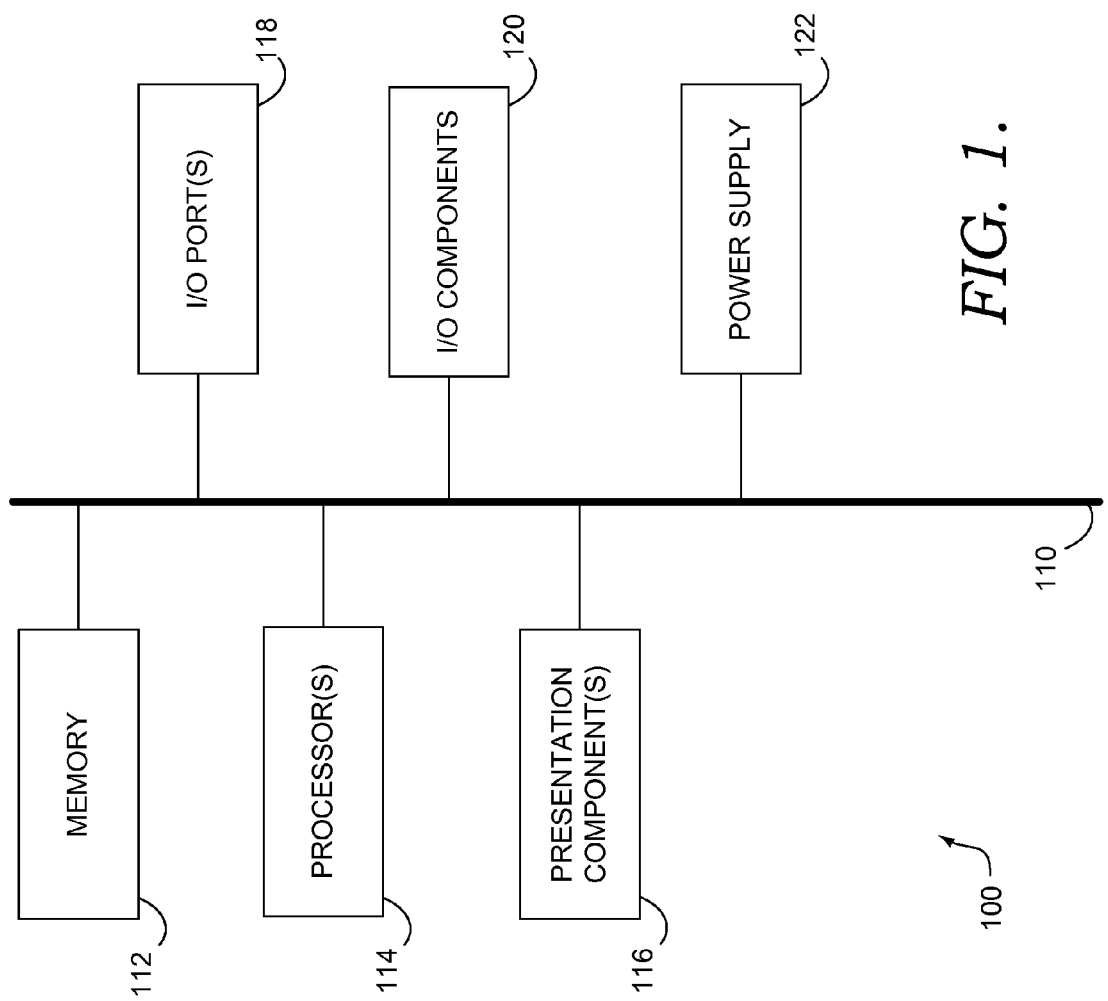
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to user interfaces and methods for providing a gamma adjustment target comprising a plurality of target elements for adjusting a gamma value of a display device. A predetermined optimal gamma value may be based upon some standard, such as sRGB standard color space, which cannot be expressed as a single numerical value, but the exponent of the power function typically used to generate a gamma curve is approximately 2.2 for sRGB displays. A power function with an exponent of 2.2 closely approximates the gamma function defined in the sRGB standard, which consists of a linear segment near zero, and a non-linear segment generated by a power function with an exponent of 2.4. Many devices, such as printers, use the sRGB color space, and therefore it is beneficial that display devices that are associated with these printers are also calibrated to the sRGB color space, such as an overall gamma value of about 2.2. If the display device and the printer are not calibrated to use the same overall gamma value, the result may be a printed image that looks different than the image that the viewer saw on the display device. The present invention allows for the adjustment of the gamma on a display device such that the gamma value on a display device and an associated printer, for example, may be reconciled.

Generally, gamma describes the nonlinear relationship between pixel levels in a computer and the luminance (e.g., the light energy that the display device emits) of an associated display device. While gamma does not have an effect on black or white, it does have an effect on middle tones. Typically, when the gamma value is set too low, middle tones appear darker than they should, but appear lighter than they should when the gamma value is set too high. Using the gamma adjustment target described herein, a viewer, without squinting to adjust the focus, may easily determine when the gamma value is nearing a predetermined optimal value, such as 2.2.

There are several ways in which gamma may be adjusted on a display device. In one instance, the gamma may be adjusted by varying the contents in look-up tables on the display device's graphics or video card. Look-up tables store red, green, and blue values and return these values to the display based on the adjusted gamma curve when a gamma value has been modified. The contents of the look-up tables are computed using a gamma function. When adjusting the content of these tables, the display is immediately adjusted. Alternatively, in another instance, a protocol, such as the Video Electronics Standard Association (VESA) Monitor Control Command Set (MCCS) standard protocol may be used to adjust the gamma on some display devices. In yet another instance, a software "wizard" calibration tool may be used to allow for easy gamma adjustment that can be done by a user. Here, a gamma adjustment target, such as that provided herein, may be provided to a user on the display device, in addition to a manipulation area that allows for a user to adjust the gamma either higher or lower, depending on the user's visual perception of the gamma adjustment target, which is static and does not change. The user may adjust the gamma to a lower value if a central region of the gamma adjustment target is darker than its surroundings and may adjust the gamma to a higher value if the central region is lighter than its surroundings. The user will know that the gamma is adjusted at or near the predetermined optimal gamma value when the central region, such as the fully transparent region, blends into its surroundings, which may be, in some embodiments, an fully opaque area.

In one aspect, a user interface embodied on one or more computer-storage media is provided, the user interface for displaying a target element used to adjust a gamma value of a display device. The user interface includes a target image constructed from a bottom static layer having alternating light and dark lines, a gray static layer that overlays at least a portion of the bottom static layer, and a progressive layer that progresses from a fully transparent area to an opaque area, and that overlays at least a portion of the gray static layer, modulating the transparency of the gray static layer. Additionally, the user interface includes a manipulation area that is used to adjust the gamma value of the display device. A user visually perceives the bottom static layer, or lined region, visible through the fully transparent area as being most similar to the opaque area when the gamma value has been adjusted toward a predetermined optimal gamma value.

In another aspect, a computerized method for adjusting a gamma value for a display device using a gamma adjustment target is provided. The method includes communicating for display at least one target element comprising a bottom static layer having alternating light and dark lines, a gray static layer that overlays at least a portion of the bottom static layer, and a progressive layer that progresses from a fully transparent area to an opaque area, wherein the progressive layer overlays at least a portion of the gray static layer. Further, the method includes receiving an indication to adjust the gamma value and causing the fully transparent area to be visually perceived as being most similar to the opaque area when the gamma value has been adjusted toward a predetermined optimal gamma value.

In yet another aspect, a user interface embodied on one or more computer-storage media is provided. The user interface is used for displaying a plurality of target elements that assist in aligning a user's line of sight with one of the plurality of target elements that is used to adjust a gamma value of a display device. The user interface includes an internal target element comprising a bottom static layer having alternating light and dark lines, a gray static layer that overlays at least a portion of the bottom static layer, and a progressive layer that progresses from a fully transparent area to an opaque area, wherein the progressive layer overlays at least a portion of the gray static layer. Further, the user interface includes two or more surrounding target elements that, when appearing most similar to each other, indicate that a user's line of sight is perpendicular to a center portion of the fully transparent area of the internal target element. The user interface additionally includes a manipulation area that is used to adjust the gamma value of the display device, wherein a user visually perceives the bottom static layer, or lined region visible through the fully transparent area of the internal target element as being most similar to the opaque area of the internal target element when the gamma value has been adjusted toward a predetermined optimal gamma value.

Having briefly described an overview of exemplary embodiments of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
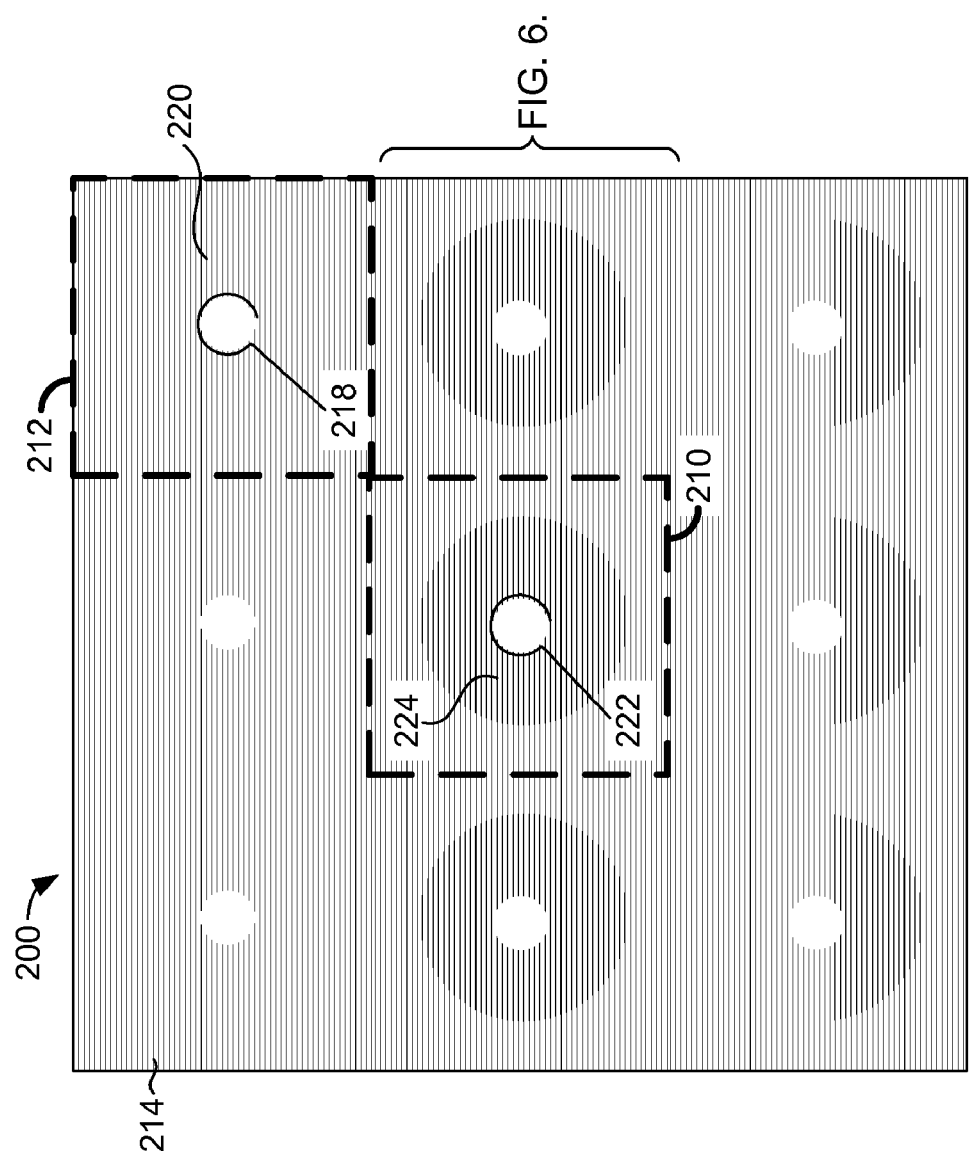
FIG. 2 is an illustrative gamma adjustment target when a gamma value is lower than a predetermined optimal gamma value, in accordance with an embodiment of the present invention.

Referring now to FIG. 2, an illustrative gamma adjustment target 200 is shown when a gamma value is lower than a predetermined optimal gamma value, in accordance with an embodiment of the present invention. Initially, the gamma adjustment target 200 illustrated in FIG. 2 includes nine target elements, shown as a three-by-three array, or grid of the target elements. It will be appreciated by one of ordinary skill that many different arrangements of target elements, in addition to a different number of target elements, may be used while still fulfilling the purpose of the present invention, as will become evident below. The three-by-three array of target elements is but one exemplary arrangement. As shown in FIG. 2, an internal target element 210 is shown surrounded by eight surrounding target elements 212. The surrounding elements 212, however, may be arranged in a circular formation in relation to the internal target element 210. Furthermore, in one instance, six, four, or even two surrounding target elements 212 may be used, while accomplishing the purpose of having multiple surrounding target elements 212, which will be discussed in more detail below. As such, the embodiment shown in FIG. 2 of a three-by-three array of target elements is provided for illustrative purposes only and is not intended to depict the only formation or the only number of target elements that may be used in a gamma adjustment target 200.

While only the internal target element(s) 210 may be used to provide a visual indication as to when the gamma value is too high, too low, or nearing a predetermined optimal gamma value, the surrounding target elements 212 may be provided for certain displays, such as liquid crystal displays (LCDs), that are very sensitive to the user's viewing angle. For accurate calibration, the user's viewing angle, or line of sight, should be perpendicular to the display prior to the calibration. Specifically, the user's line of sight may be perpendicular to an internal portion of the internal target element 210, shown in FIG. 2 as a fully transparent area 222. This provides a very specific advantage in that it can be ensured that the gamma value is being adjusted accurately. If viewed off-angle, the surrounding target elements 212, such as those along the top, bottom, and sides of the three-by-three array in FIG. 2, will appear different from each other, in addition to appearing different from the internal target element 210. When, however, the internal target element 210 is viewed perpendicularly, then the top, bottom, and side target elements (e.g., surrounding target elements 212) will appear similar to each other. This instills confidence in the user that the user is viewing the internal target element 210 perpendicularly, and thus will perform an accurate gamma adjustment.

The gamma adjustment target 200 generally consists of three separate and distinct logical, structural layers. These three layers will become more apparent when described in relation to FIG. 6. Here, a first, or a bottom static layer 214 is shown having alternating dark and light lines (e.g., alternating black and white lines). In one embodiment, the alternating dark and light lines are of equal height, such as, for example, one pixel. When the alternating dark and light lines are of approximately equal height, the result is a visual perception of an approximately 50% gray overlay, thereby being composed of 50% black and 50% white. In another embodiment, however, the dark lines may be greater in height than the light lines, or the light lines may be greater in height than the dark lines.

Above the bottom static layer 214 may be a gray static layer that overlays at least a portion of the bottom static layer, and in one embodiment, overlays the entire bottom static layer. This gray static layer is solid gray, and may match the gray tone of the perimeter of the gamma adjustment target, in some embodiments. The third layer is a progressive layer, illustrated by a fully transparent area 218 and 222, which gradually progresses to an opaque area 220 and 224. Items 218 and 220 correspond to the surrounding target elements 212, and items 222 and 224 correspond to the internal target element 210. In the embodiment of FIG. 2, the progressive layer, also termed transparency mask or transparency operator, takes the form of a circular gradient (e.g., radial gradient). Other embodiments, however, may include other gradient forms for the progressive layer, such as, but not limited to a rectangular gradient or a linear gradient. Additionally, various contours of rate of change of transparency may be used in the gradient.

It should be noted that the gamma adjustment target 200 and associated target elements 210 and 212 are static, and do not change at all during the gamma adjustment process. A display device may contain a graphics card, on which a set of look-up tables exist. These gamma look-up tables contain a digitized gamma curve, which is generated by applying a power function to the incoming red, green, or blue value. This power function is called gamma. As the gamma value is varied during this process, the contents of the look-up tables change, which changes the mapping between the incoming red, green, and blue values, and the amount of light that results on the display device. As such, the gamma adjustment target does not vary, but only the user's or viewer's perception of the gamma adjustment target is changing, wherein the entire gamma adjustment target may appear lighter or darker, depending on how the gamma value has been adjusted.

As mentioned above, the embodiment of FIG. 2 illustrates a gamma adjustment target 200 wherein the gamma value is low such that the user may perceive not only the entire gamma adjustment target 200 as being darker, but also may perceive the fully transparent area 222 as being lighter in tone relative to the surrounding region 224, such as is shown in FIG. 2. The transparency operator, or the progressive layer is static, and determines whether a viewer sees through the gray completely to the background, or whether the gray is opaque. Generally, gamma is a nonlinear operation used to code and decode luminance values in video or still image systems, such as display devices. Stated another way, gamma is the nonlinearity of response of a display. Gamma may be adjusted to ensure that a large body of content displays correctly on a display device. sRGB is a color space standard that is used on monitors, printers, the Internet, etc. The overall gamma of sRGB is approximately 2.2, consisting of a linear section and a nonlinear section, such that the nonlinear portion of the sRGB gamma function has an exponent of 2.4, which is defined in the standard. This complex gamma function is closely approximated by a simple power function with an exponent of 2.2. This may be called "simplified sRGB."

One exemplary illustration of a reason why a user would want to adjust the gamma on a display device is that printers are typically set to the sRGB. If a display device is not set to these standards (e.g., if a display device is not set to a gamma of 2.2), the colors, brightness, and tonality that a user sees on the display device may not match with the color, brightness, and tonality that is seen when an image is printed. For this reason, it is important that users adjust the gamma on a display device so that it is in sync with the sRGB, which may, in one embodiment, be around 2.2.

Figure 3:
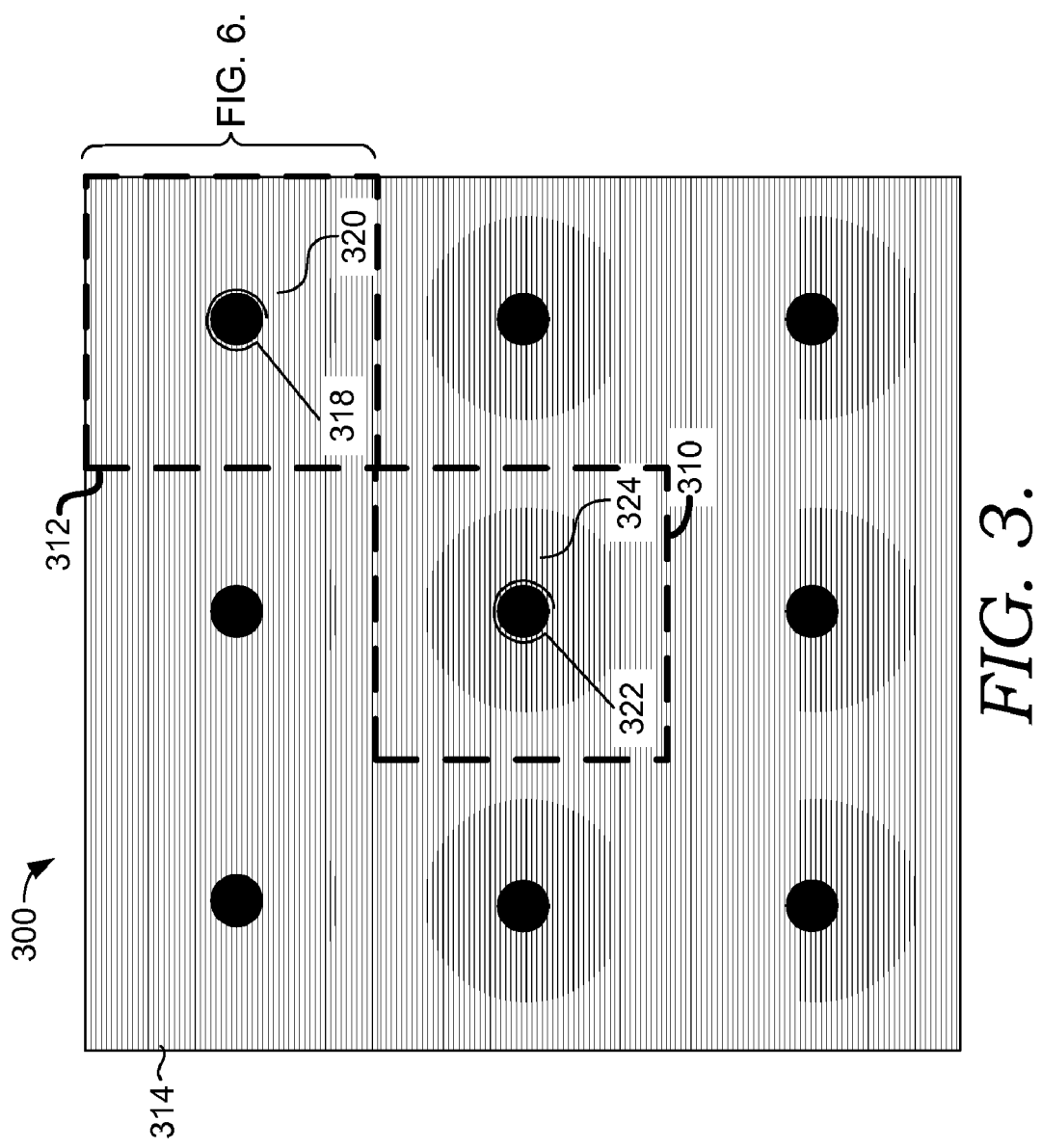
FIG. 3 is an illustrative gamma adjustment target when a gamma value is higher than a predetermined optimal gamma value, in accordance with an embodiment of the present invention.

FIG. 3 is an illustrative gamma adjustment target 300 when a gamma value is higher than a predetermined optimal gamma value, in accordance with an embodiment of the present invention. FIG. 3 is similar to FIG. 2 in that it illustrates target elements arranged in a three-by-three array having an internal target element 310 and eight surrounding target elements 312. The gamma adjustment target 300 generally consists of three layers, including alternating light and dark lines, or a bottom static layer 314, a gray static layer that overlays at least a portion of the bottom static layer 314, and a progressive layer that includes a fully transparent area 318 and 322, that progressively changes to an opaque area 320 and 324. The embodiment of FIG. 3 illustrates a circular, or radial gradient 320 and 324. This transparent mask or progressive layer, however, may take other forms. For example, the gradient may be a rectangular gradient, linear gradient, etc. The three layers may be seen in more detail in FIG. 6. In contrast to FIG. 2, however, the fully transparent areas 320 and 324 of both the internal target element 310 and the surrounding target elements 312 are lightened, when compared to the fully transparent areas 218 and 222 of FIG. 2. The fully transparent areas 318 and 322, appearing darker relative to the surrounding target, may indicate that the gamma has been adjusted so that it is higher than a predetermined optimal gamma value (e.g., 2.2).

Figure 4:
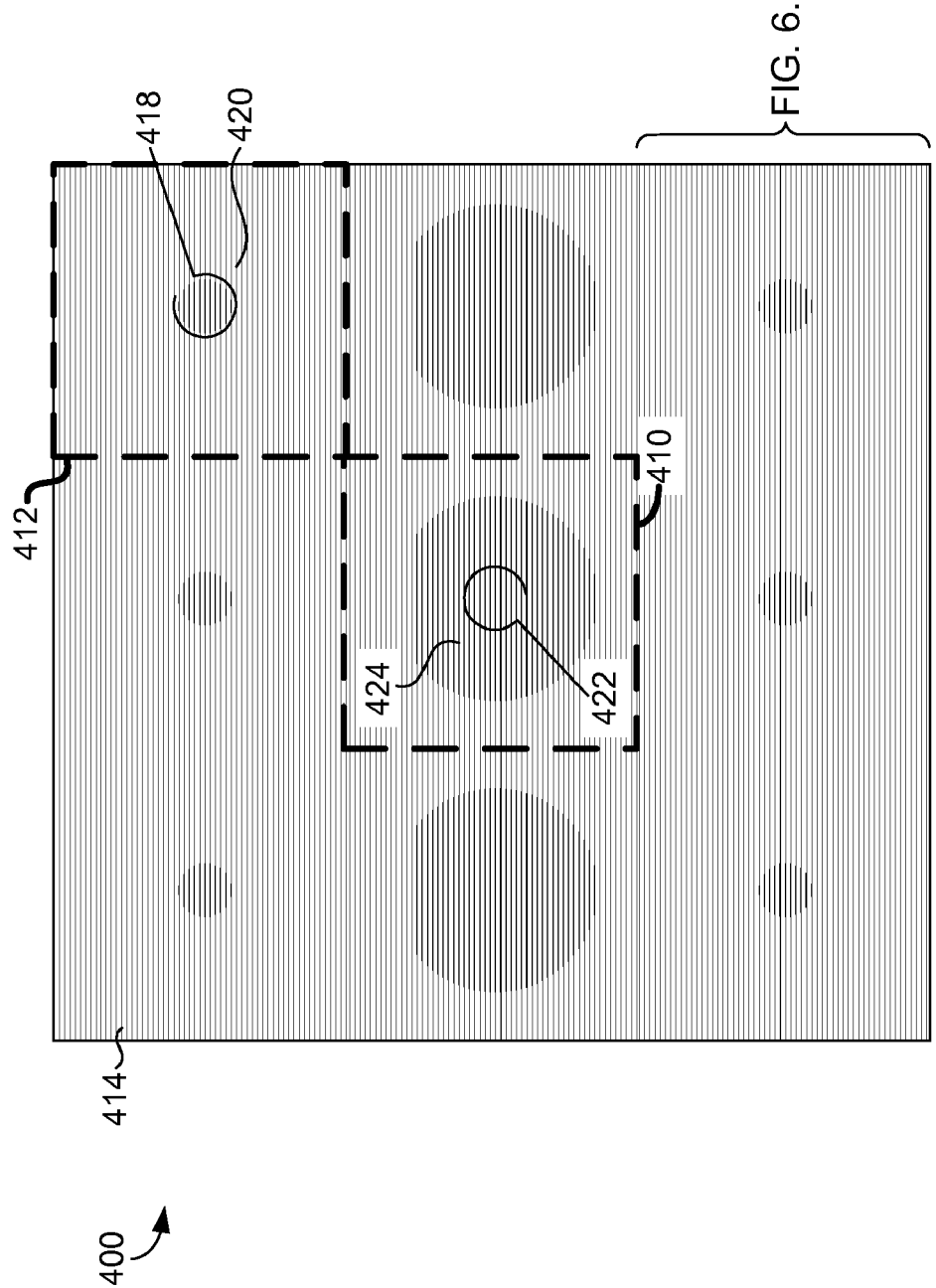
FIG. 4 is an illustrative gamma adjustment target when a gamma value has been adjusted toward a predetermined optimal gamma value, in accordance with an embodiment of the present invention.

Turning to FIG. 4, an illustrative gamma adjustment target 400 is shown when a gamma value has been adjusted toward a predetermined optimal gamma value, in accordance with an embodiment of the present invention. FIG. 4 is similar to FIGS. 2 and 3 in that each of the figures depicts a gamma adjustment target having nine target elements arranged in a three-by-three grid. The gamma adjustment target 400 shown in FIG. 4 consists of an internal target element 410 and multiple surrounding target elements 412. Here, eight surrounding target elements 412 are illustrated. It should be noted that any number of target elements, and many other arrangements may be used in conjunction with the present invention, while still accomplishing the purposes of the present invention. In one instance, the surrounding target elements 412 may be positioned in a circular formation around the internal target element 410. In another instance, there may be just two surrounding target elements 412, and these may be positioned on either side of the internal target element 410 or even above and below the internal target element 410.

When determining whether the user's line of sight is perpendicular to the center of the internal target element, such as the fully transparent area 422, the surrounding target elements 412 are used to assist in making this determination. In some embodiments, there may be two or more surrounding target elements 412 present such that the user may make the determination as to when the user's line of sight is at the correct angle, which may be when the surrounding target elements look similar to each other. For exemplary purposes only, if one of the surrounding target elements has a light center, but another has a darker, or even black center, it may be determined that the user's line of sight is not perpendicular to the center, or internal fully transparent area 422.

The gamma adjustment target 400 includes several layers, including a bottom static layer 414 having alternating light and dark lines, which, in some embodiments, may be of equal height (e.g., one pixel each). The light and dark lines may be black and white, and as such, may create the visual appearance of a 50% gray layer, being 50% white and 50% black. In another embodiment, the alternating lines are not of equal height such that either the dark lines are of greater height than the light lines, or the light lines are of greater height than the dark lines. Above the bottom static layer is a gray static layer, which will become more apparent in FIG. 6. The uppermost or top layer is a progressive layer and comprises a fully transparent area 418 and 422, along with an opaque area 420 and 424. Items 418 and 420 are associated with the surrounding target elements 412, and items 422 and 424 are associated with the internal target element 410.

As previously mentioned, when the gamma has been adjusted such that it is lower than a predetermined optimal value, the fully transparent area showing the bottom static layer (e.g., lined layer) in each target element may be perceived by the viewer to be lighter than the rest of the target, and may even appear white. When the gamma has been adjusted such that it is higher than a predetermined optimal value, however, the fully transparent area showing the bottom static layer (e.g., lined layer) in each target element may be perceived by the viewer to be darker than the rest of the target. In the case of the gamma having been adjusted such that it is at or near a predetermined optimal gamma value, the fully transparent area, shown as items 420 and 424, may appear to blend into the rest of the target, or at least the other portion of the progressive layer. Although the appearance of the fully transparent layer, in addition to the rest of the target element, visually appears to change tone as described above, the target elements themselves are completely static and do not change. As the gamma is adjusted, the viewer may visually perceive a change in color or brightness, but the targets themselves do not change at all.

Figure 5:
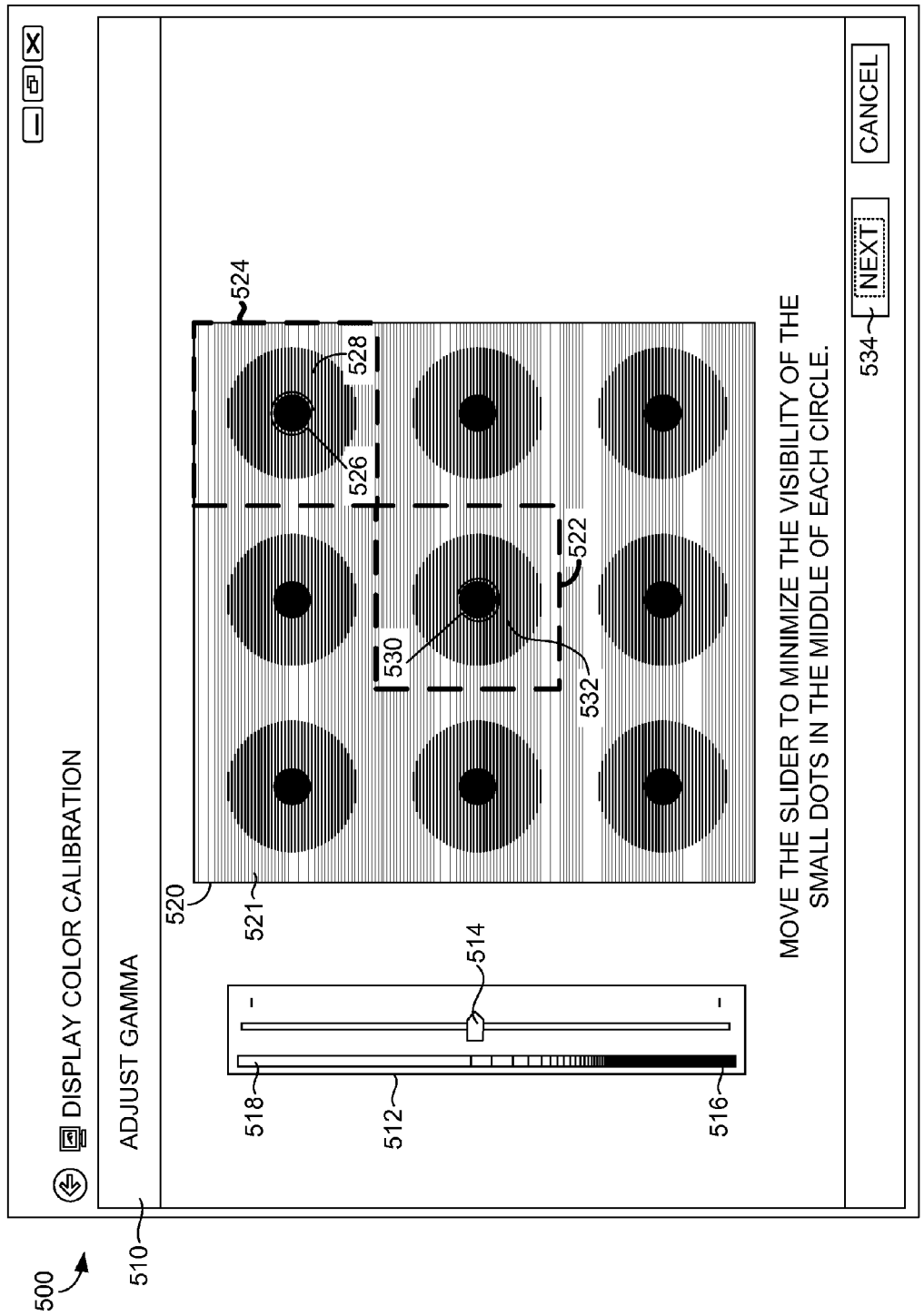
FIG. 5 is an illustrative screen display of an exemplary gamma adjustment page showing a gamma adjustment target and an adjustment sliding mechanism, in accordance with an embodiment of the present invention.

FIG. 5 is an illustrative screen display 500 of an exemplary gamma adjustment page showing a gamma adjustment target and an adjustment sliding mechanism, in accordance with an embodiment of the present invention. Initially, FIG. 5 may be used to, for example, adjust the gamma of a display device, as indicated by the "Adjust Gamma" heading 510 of the exemplary screen display 500. The exemplary screen display 500 includes a manipulation area 512 that is used to adjust the gamma value of the display device. The user may select (e.g., click on) a sliding mechanism 514, which may have a positional indicator that may move either up or down. The sliding mechanism, in one embodiment, may be positioned horizontally instead of vertically. Further, the manipulation of the gamma value may be accomplished entirely via a keyboard, such as arrow keys or page up and page down keys. Additionally, a numeric edit box may appear on the screen that allows for the user to manually enter a gamma value. Moving the sliding mechanism 514 up toward the light area 518 may decrease the gamma value, therefore resulting in a viewer perceiving the fully transparent area of a target as being lighter than the surrounding areas, such as the opaque area. Moving the sliding mechanism 514 down toward the darker area 516 may have the reverse effect, thus increasing the gamma and causing the viewer to visually perceive the fully transparent area as being darker than the surrounding area, although the target itself is static, and does not change.

In addition to the manipulation area 512, a gamma adjustment target 520 is illustrated on the exemplary screen display 500 having an internal target element 522 and multiple surrounding target elements 524. While the configuration shown of the gamma adjustment target 520 in the embodiment of FIG. 5 is a three-by-three grid, other formations and other numbers of target elements are certainly considered to be within the scope of the present invention. Examples of alternate formations have been described above herein. A background static layer 521 consisting of alternating light and dark lines is shown which, in some embodiments, may be black and white lines, and may be of equal height thus creating the visual appearance of a 50% gray area. In one embodiment, the alternating light and dark lines are not of equal height. Above the background static layer 521 may be a gray static layer consisting of a solid gray area that overlays at least a portion of the background static layer 521. In one instance, the gray static area overlays the entire background static layer 521 such that there is a visual appearance of a gray overtone over the light and dark lines.

The third layer is a progressive layer generally consisting of a fully transparent area 526 and 530, which gradually or progressively changes to an opaque area 528 and 532 in the form of a circular or radial gradient. While a circular radiant is shown here, other types or forms of gradients may also be used, including, but certainly not limited to, a rectangular gradient or a linear gradient. Items 526 and 528 are associated with the surrounding target elements 524, and items 530 and 532 are associated with the internal target element 522. Generally, while only one internal target element has been referred to herein, it is contemplated that more than one internal target element may be used as the visual target while a user is adjusting the gamma of a display device.

As shown in FIG. 5, the internal fully transparent area 530, as well as the fully transparent areas 526 of the surrounding target elements 524, are darker than the surrounding target, which may indicate that the gamma has been adjusted such that it is higher than a predetermined optimal gamma value. Although the fully transparent areas 526 and 530 look dark, or even black, as previously mentioned, the target has not changed in color at all. It is the user perceiving this area to look darker than the surrounding areas. In addition to the fully transparent areas 526 and 530 appearing darker than surrounding areas, the entire gamma adjustment target 520 may appear lighter (e.g., a lighter shade of gray) when the gamma has been changed so that it is higher than the predetermined optimal gamma value. As mentioned, the goal of presenting a screen display such as that shown in FIG. 5 is to allow a user to adjust the gamma such that the visibility of the fully transparent areas 526 and 530 are minimized, such that these areas blend in with the other areas of the target. Once this has been achieved, the user may select a "NEXT" button 534, which may result in the gamma value change taking effect on the display device.

In one embodiment, the illustrative screen display 500 of FIG. 5 may be used as part of a gamma adjustment wizard. When a user indicates that he/she would like to modify the gamma of the display device, a wizard may be presented, and may display a screen similar to the illustrative screen display 500 having a manipulation area 512 and a gamma adjustment target 520. By providing a wizard, which may automatically adjust the gamma curve when a gamma value is received, the user greatly benefits, such that the user is not given the task of altering the gamma curve, which may require significant time and effort on the user's part.

Figure 6:
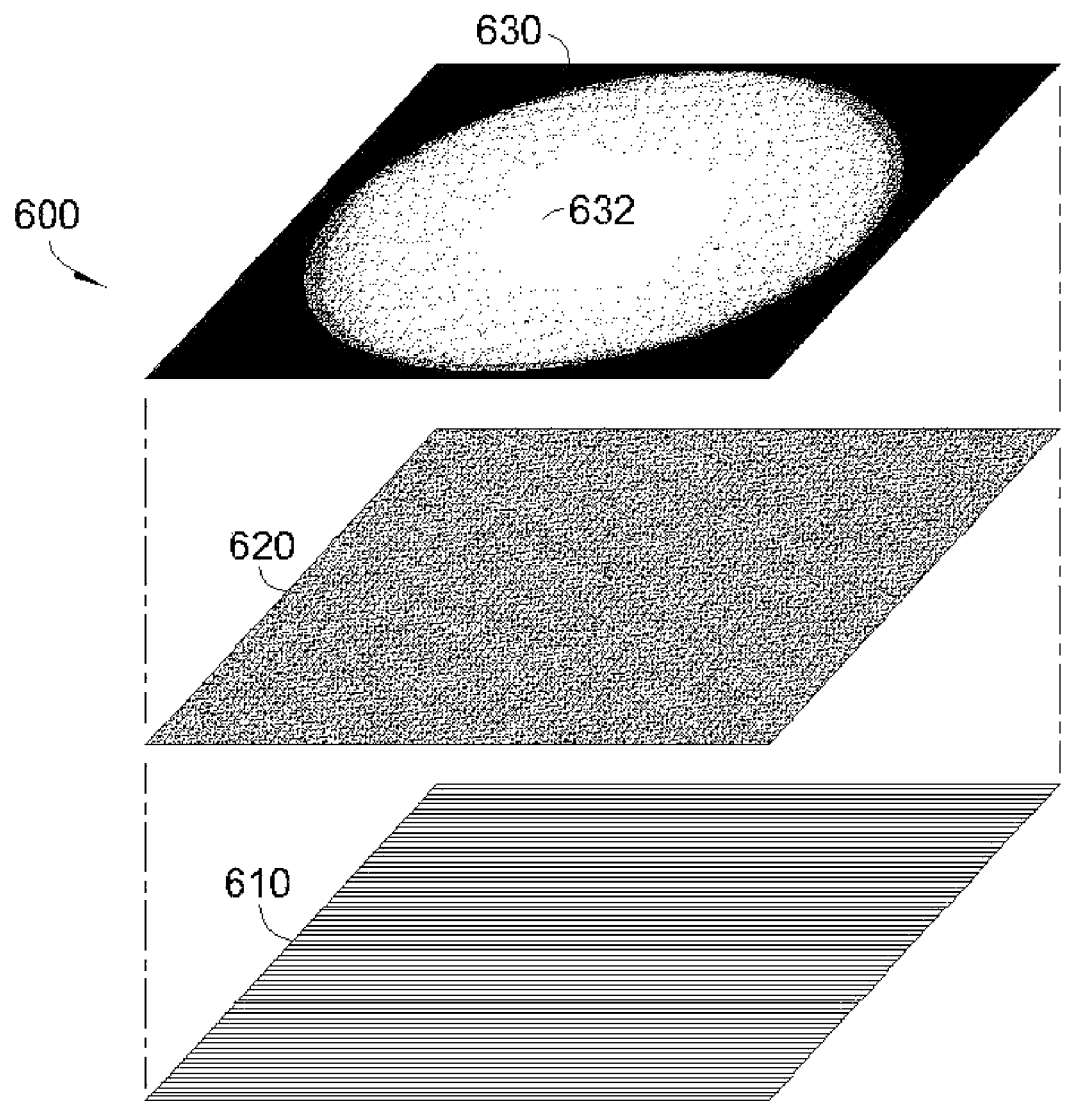
FIG. 6 is an illustrative portion of an exemplary gamma adjustment target showing three logical layers involved in its construction, in accordance with an embodiment of the present invention.

Referring to FIG. 6, an illustrative portion 600 of an exemplary gamma adjustment target is shown having three distinct layers, in accordance with an embodiment of the present invention. While gamma adjustment targets have been shown in FIGS. 2, 3, 4, and 5, for example, the embodiment of FIG. 6 illustrates the three layers of the gamma adjustment target in more detail than was provided above herein. Initially, the three layers include a first layer called a bottom static layer 610, a second layer called a gray static layer 620, and a third layer called a progressive layer 630. Although three layers are illustrated in FIG. 6, it is contemplated to be within the scope of the present invention that more or less than three layers may be used to accomplish the objectives set forth herein. Three layers are used to illustrate just one embodiment of the present invention, as other embodiments may encompass different layers, or even layers in a different order.

The first layer, the bottom static layer 610, comprises alternating dark and light lines. In one embodiment, the lines are black and white, such that a gray tone may be visualized. The lines may be of different heights, or may be of equal height, such as one pixel each. The shorter in height that the alternating lines are, the easier it may be for a user to integrate the lines to a gray scale. The bottom static layer 610 is static, and does not change at all. When the alternating black and white lines are of equal height, the user may perceive a gray tone, being roughly 50% black and 50% white, thereby producing a 50% gray tone.

The second layer, the gray static layer 620, is a solid gray layer that may generally match the shade of the perimeter of the gamma adjustment target, and is usually selected based on the desired target gamma value. In one embodiment, the gray static layer 620 overlays just a portion of the bottom static layer 610, but in another embodiment, the gray static layer 620 overlays the entire bottom static layer 610. As the gamma is adjusted, the surrounding gray varies in shade, as the entire screen appears to get lighter or darker, even though the gamma adjustment target itself is not changing, just the user's visual perception of it. As the gamma is being manipulated, the midpoint of the gamma curve may vary based on the gamma, although the end points (e.g., the white and black points) do not change. The shape of the gamma curve varies as the gamma varies, which, as stated, alters only the midpoint of the gamma curve. Because of the change in the curve, the gray tone of the gamma adjustment target varies up and down in lightness.

The third layer, or the progressive layer 630, may take many forms. As shown in the embodiment of FIG. 6, the progressive layer 630 includes a circular gradient that overlays each target element. A gradient is a progression that varies from one color or shade to another. For example, an area that progressed from light gray to dark gray may be termed a gradient. The circular gradient varies from a fully transparent region 632 in the center of each target element, to a solid, or opaque area (e.g., target gray level) near the perimeter of the radial gradient. FIG. 6 illustrates just a cut out of each layer, and therefore the perimeter of the radial gradient may not be shown conceptually, as the progressive layer modulates the transparency of the gray static layer. This can be shown, however, in FIGS. 2, 3, 4, and 5.

With continued reference to FIG. 6, the circular gradient may also be termed a transparency mask or a transparency operator in the form of a circular gradient. This transparency operator determines whether the user or viewer is seeing through the gray static layer 620 completely to the background, or whether the gray is opaque, and therefore not transparent at all, or at least to the same degree as the center region. Generally, the transparency operator alters the transparency of the gray static layer 620 from the fully transparent circular region at the center of each target element, to a fully opaque region at the perimeter. While the progressive layer 630 has been referred to and illustrated as a circular gradient, other shapes of gradients may be used in accordance with the present invention. For example, rectangular or linear gradients may be used.

Figure 7:
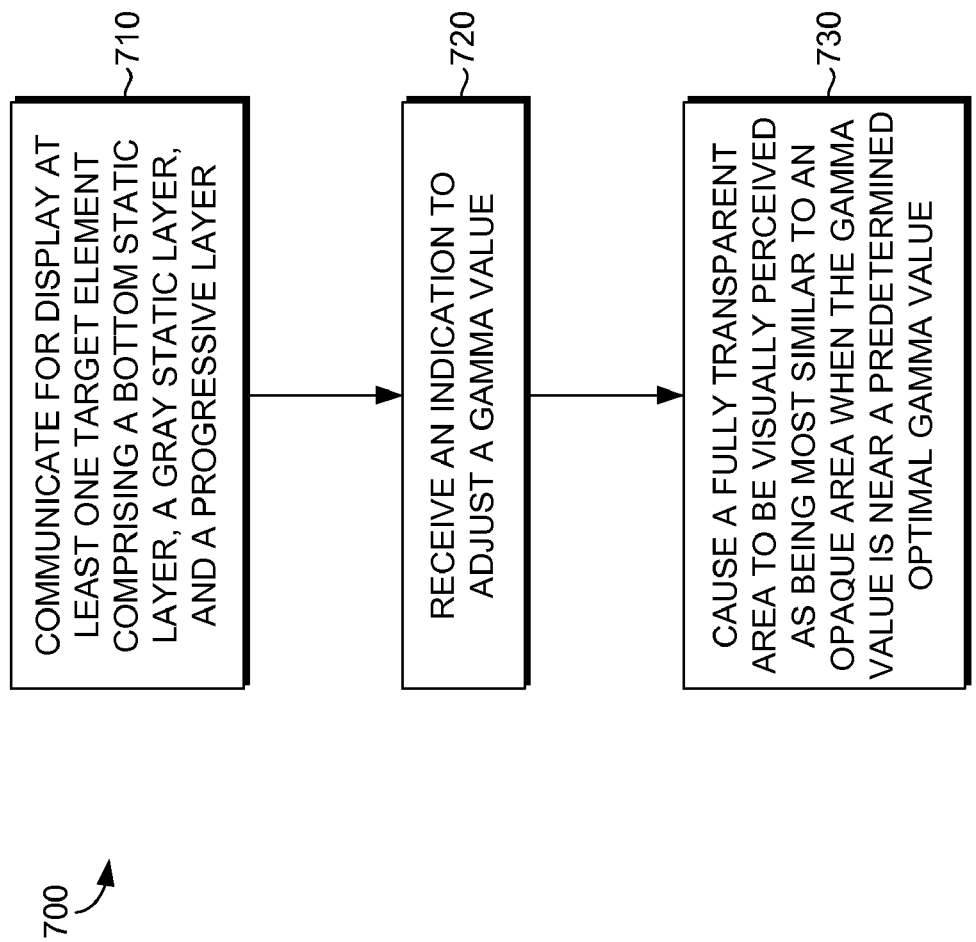
FIG. 7 is an illustrative flow diagram of a method for adjusting a gamma value for a display device using a gamma adjustment target, in accordance with an embodiment of the present invention.

Turning now to FIG. 7, an illustrative flow diagram 700 is shown of a method for adjusting a gamma value for a display device using a gamma adjustment target, in accordance with an embodiment of the present invention. Initially at step 710, at least one target element is communicated for display. The target elements include a bottom static layer having alternating light and dark lines (e.g., white and black lines), a gray static layer that overlays at least a portion of the bottom static layer, and a progressive layer that progresses from a fully transparent area to an opaque area. In accordance with the embodiment of FIG. 7, the progressive layer overlays at least a portion of the gray static layer, and in some embodiments, may overlay the entire gray static layer and the entire bottom static layer. In one embodiment, alternating light and dark lines are not used as the pattern for the bottom static layer, but dots or some other pattern that creates a half-toning effect are used. Further, in one aspect of the present invention, there may be an internal target element and a plurality of surrounding target element that surround the internal target element. In one embodiment, the internal target element and the surrounding target elements are identical, each having the three distinct, logical layers as described herein. In another embodiment, the internal target element is visually distinct from the surrounding target elements.

At step 720, an indication is received to adjust the gamma value. As previously discussed, this indication may be received from a user, in one embodiment, who may be adjusting the gamma using a wizard calibration tool that may include a manipulation area having a sliding mechanism, and that displays a gamma adjustment target so that the user knows that the target is near the predetermined optimal gamma value (e.g., 2.2 using the sRGB scale). The user may know this when the fully transparent area near the center of each target element blends into the other portions of the target element, such as the opaque area near the perimeter of the circular gradient. Some users may be able to adjust the gamma on a display device by utilizing a protocol, such as the VESA MCCS standard protocol. Alternatively, the gamma may be adjusted by adjusting the contents of the look-up tables contained within a display card associated with a display device. Changing values within the look-up tables changes the mapping between the incoming red, green, and blue (RGB) values and the amount of light those values result in on the screen. Changing values in the look-up tables alters the mid-point of the gamma curve.

At step 730, the fully transparent area is caused to be visually perceived as being most similar to the opaque area when the gamma value has been adjusted toward a predetermined optimal gamma value. The fully transparent area will visually appear darker than its surroundings if the gamma has been adjusted too high, and will appear light, or even white when the gamma has been adjusted too low. It will, however, blend into its surroundings more and more as the gamma value approaches the predetermined optimal gamma value. As mentioned, the gamma adjustment target itself does not change at all, but it is the user who visually perceives a change in the target as the gamma of the display changes, which may be a variance from a lighter tone to a darker tone (e.g., gray tone), in addition to seeing variances in the fully transparent area from relatively light to relatively dark.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the methods. It will be understood that certain features and subcombinations are of utility and may be employed without reference to other features and subcombinations. This is contemplated by and is within the scope of the claims.

What is claimed is:

1. A user interface embodied on one or more computer-storage media devices, the user interface for displaying a target element used to adjust a gamma value of a display device, the user interface comprising:
   (a) a bottom static layer,
   (b) a gray static layer, and
   (c) a progressive layer comprising a radial gradient that progresses from a fully transparent area in the center of the radial gradient to an opaque area near the perimeter of the radial gradient; and
   a manipulation area that is used to adjust the gamma value of the display device such that a user visually perceives the fully transparent area as being most similar to the opaque area when the gamma value has been adjusted toward a predetermined optimal gamma value.

2. The user interface of claim 1, wherein the predetermined optimal gamma value is determined by a standard red green blue (sRGB) color space.

3. The user interface of claim 2, wherein the predetermined optimal gamma value is 2.2.

4. The user interface of claim 1, wherein the radial gradient is a circular gradient.

5. The user interface of claim 4, wherein the fully transparent area is circular.

6. The user interface of claim 1, wherein the gamma value is lower than the predetermined optimal gamma value if the fully transparent area appears lighter than the opaque area.

7. The user interface of claim 1, wherein the gamma value is higher than the predetermined optimal gamma value if the fully transparent area appears darker than the opaque area.

8. A computerized method for adjusting a gamma value for a display device using a gamma adjustment target, the method comprising:
   communicating for display, at a computing device having a processor and a memory, at least one target element comprising a bottom static layer, a gray static layer, and a progressive layer comprising a radial gradient that progresses from a fully transparent area at the center of the radial gradient to an opaque area near the perimeter of the radial gradient;
   receiving an indication to adjust the gamma value; and
   at the computing device, causing the fully transparent area to be visually perceived as being most similar to the opaque area when the gamma value has been adjusted toward a predetermined optimal gamma value.

9. The method of claim 8, wherein the gamma value is lower than the predetermined optimal gamma value if the fully transparent area appears lighter than the opaque area.

10. The method of claim 8, wherein the gamma value is higher than the predetermined optimal gamma value if the fully transparent area appears darker than the opaque area.

11. The method of claim 8, wherein the predetermined optimal gamma value is determined by a standard red green blue (sRGB) color space, and wherein the predetermined optimal gamma value is 2.2.

12. The method of claim 8, wherein the radial gradient is a circular gradient such that the fully transparent area and the opaque area, together, take the form of a circle.

13. The method of claim 8, wherein the gamma value represents a non-linearity of response of the display device.

14. A user interface embodied on one or more computer-storage media devices, the user interface for displaying a plurality of target elements that assist in aligning a user's line of sight with one of the plurality of target elements that is used to adjust a gamma value of a display device, the user interface comprising:
   an internal target element comprising a bottom static layer that incorporates a pattern thus resulting in half-toning of the bottom static layer,
   a gray static layer that overlays at least a portion of the bottom static layer, and a progressive layer comprising a radial gradient that progresses from a fully transparent area at the center of the radial gradient to an opaque area near the perimeter of the radial gradient;
   two or more surrounding target elements that, when appearing most similar to each other, indicate that a user's line of sight is perpendicular to a center portion of the fully transparent area of the internal target element; and
   a manipulation area that is used to adjust the gamma value of the display device, wherein a user visually perceives the fully transparent area of the internal target element as being most similar to the opaque area of the internal target element when the gamma value has been adjusted toward a predetermined optimal gamma value.

15. The user interface of claim 14, wherein there are eight of the surrounding target elements that surround a centrally positioned internal target element such that a three-by-three array of the target elements is formed.

16. The user interface of claim 14, wherein if the user's line of sight is not perpendicular to the center portion of the fully transparent area of the internal target element, the two or more surrounding target elements appear different from each other, in addition to the internal target element.

17. The user interface of claim 14, wherein the manipulation area that is used to adjust the gamma value is a sliding mechanism that allows a user to increase or decrease the gamma value by moving a positional indicator on the sliding mechanism.

18. The user interface of claim 14, wherein the display device is a liquid crystal display (LCD).

19. The user interface of claim 14, wherein the gamma value is lower than the predetermined optimal gamma value if the fully transparent area appears lighter than the opaque area.

20. The user interface of claim 14, wherein the gamma value is higher than the predetermined optimal gamma value if the fully transparent area appears darker than the opaque area.

* * * * *